United States Patent
Verstuyft et al.

(10) Patent No.: US 10,781,107 B2
(45) Date of Patent: Sep. 22, 2020

(54) MINERAL SLURRIES

(71) Applicant: Imerys Minerals Limited, Par Cornwall (GB)

(72) Inventors: Lieven Verstuyft, Oosterzele (BE); Helen Dollani, Par Cornwall (GB)

(73) Assignee: IMERTECH SAS, Paris (FR)

( * ) Notice: Subject to any disclaimer, the term of this patent is extended or adjusted under 35 U.S.C. 154(b) by 185 days.

(21) Appl. No.: 15/562,366

(22) PCT Filed: Mar. 23, 2016

(86) PCT No.: PCT/GB2016/050808
§ 371 (c)(1),
(2) Date: Sep. 27, 2017

(87) PCT Pub. No.: WO2016/156804
PCT Pub. Date: Oct. 6, 2016

(65) Prior Publication Data
US 2018/0282170 A1    Oct. 4, 2018

(30) Foreign Application Priority Data

Mar. 27, 2015   (GB) .................................. 1505320.0

(51) Int. Cl.
| | |
|---|---|
| *C09C 1/02* | (2006.01) |
| *C01B 33/22* | (2006.01) |
| *C01B 33/40* | (2006.01) |
| *C09C 1/42* | (2006.01) |
| *C09C 1/28* | (2006.01) |
| *C08L 33/04* | (2006.01) |
| *C08L 71/02* | (2006.01) |
| *C09C 3/06* | (2006.01) |
| *C09C 3/10* | (2006.01) |
| *C09D 1/04* | (2006.01) |
| *C04B 14/00* | (2006.01) |

(52) U.S. Cl.
CPC .............. *C01B 33/22* (2013.01); *C01B 33/40* (2013.01); *C08L 33/04* (2013.01); *C08L 71/02* (2013.01); *C09C 1/28* (2013.01); *C09C 1/42* (2013.01); *C09C 3/06* (2013.01); *C09C 3/10* (2013.01); *C09D 1/04* (2013.01); *C01P 2004/53* (2013.01); *C01P 2006/22* (2013.01)

(58) Field of Classification Search
CPC combination set(s) only.
See application file for complete search history.

(56) References Cited

U.S. PATENT DOCUMENTS

| | | | |
|---|---|---|---|
| 6,267,811 B1 | 7/2001 | Cherukuri | |
| 2005/0081753 A1* | 4/2005 | Nichols | ................ A01G 13/02 |
| | | | 106/486 |
| 2008/0093039 A1 | 4/2008 | Gane | |
| 2011/0263774 A1 | 10/2011 | Mongoin | |
| 2012/0059106 A1 | 3/2012 | Creamer | |
| 2015/0259857 A1* | 9/2015 | Yildirim | ................ D21H 17/69 |
| | | | 162/168.7 |

FOREIGN PATENT DOCUMENTS

| | | |
|---|---|---|
| EP | 0377283 A2 | 11/1990 |
| JP | 2-259197 | 3/1993 |

OTHER PUBLICATIONS

International Search Report and Written Opinion in PCT/GB2016/050808.

* cited by examiner

*Primary Examiner* — James E McDonough
(74) *Attorney, Agent, or Firm* — Finnegan, Henderson, Farabow, Garrett & Dunner

(57) ABSTRACT

Stable mineral slurries and methods of making stable mineral slurries.

20 Claims, No Drawings

MINERAL SLURRIES

CLAIM FOR PRIORITY

This application is a U.S. national phase entry under 35 U.S.C. § 371 from PCT International Application No. PCT/GB2016/050808, filed Mar. 23, 2016, which claims the benefit of priority of GB Application No. 1505320.0, filed Mar. 27, 2015, to both of which this application claims priority and both of which are incorporated herein by reference.

TECHNICAL FIELD

The present invention is directed to stable mineral slurries, and to methods of making stable mineral slurries.

BACKGROUND OF THE INVENTION

It is often desirable for mineral slurries to have a relatively high solids content. However, a problem is that the viscosity of the mineral slurries may increase during storage, particularly if they are stored for several days or weeks without agitation. In other words, the mineral slurry is unstable over extended periods of storage.

Instability problems such as high viscosity may cause problems during processing and handling of the mineral slurry after storage.

It may be desirable to provide alternative and/or improved mineral slurries which are stable over extended periods of storage.

SUMMARY OF THE INVENTION

According to a first aspect, the present invention is directed to a mineral slurry comprising an inorganic particulate material, for example, hydrophobic mineral, and a viscosity buffer, wherein: (i) the mineral slurry is stable for at least one week without agitation, and/or (ii) the Brookfield viscosity (100 rpm @ 1 minute) of the mineral slurry does not increase by more than 200% following one week without agitation, and/or (iii) the mineral slurry has a Brookfield viscosity (100 rpm @ 1 minute) of no more than 1600 cP following one week without agitation.

According to a second aspect, the present invention is directed to a method of improving the stability of a mineral slurry having a total solid minerals content of at least about 50% by weight, based on the total weight of the mineral slurry, and comprising at least about 40% by weight of an inorganic particulate material, for example, hydrophobic mineral, based on the total weight of the slurry, the method comprising combining, in suitable amounts, an inorganic particulate material, for example, hydrophobic mineral, a viscosity buffer and liquid to form a mineral slurry which is stable for at least one week without agitation.

According to a third aspect, the present invention is directed to a method of making a mineral slurry which is stable for at least one week without agitation, the method comprising combining in a liquid an inorganic particulate material, for example, hydrophobic mineral, with a stabilizing amount of a viscosity buffer.

According to a fourth aspect, the present invention is directed to the use of a viscosity buffer in a mineral slurry to enhance the stability of the mineral slurry.

According to a fifth aspect, the present invention is directed to the use of kaolin and/or non-mineral, non-polyacrylate material as a viscosity buffer in a mineral slurry comprising an inorganic particulate material, for example, hydrophobic mineral, for example, a mineral slurry having a total solid minerals content of at least about 50% by weight, based on the total weight of the mineral slurry, and comprising at least about 40% by weight of an inorganic particulate material, for example, hydrophobic mineral.

According to a fifth aspect, the present invention is directed to a coating composition, for example, paint, comprising, consisting essentially of, or consisting of, the mineral slurry according to first aspect of the present invention.

DETAILED DESCRIPTION OF THE INVENTION

It has surprisingly been found that stable mineral slurries comprising relatively high amounts of inorganic particulate material, for example, a hydrophobic mineral, are obtainable by incorporation of a viscosity buffer.

By "stable" is meant that the mineral slurry including viscosity buffer remains pumpable and, thus, sufficiently fluidic, over an extended period of time without agitation. The extended period of time may be at least 48 hours, or at least one week, or at least 10 days, or at least two weeks. As such, the addition of the viscosity buffer provides the mineral slurry with an enhanced resistance to viscosity increases upon standing (i.e., without agitation) for a period longer than would be the case without the addition of the viscosity buffer, e.g., a period of at least one week, or at least 10 days, or at least two weeks. In certain embodiments, the viscosity of the mineral slurry is determined as Brookfield viscosity in accordance with ASTM D2196 (100 rpm @ 1 min).

Additionally or alternatively, "stable" means that the mineral slurry including the viscosity buffer has a reduced or no tendency to sediment over an extended period of time without agitation. Sedimentation may be determined by observing the time taken to gel formation. The extended period of time may be at least 48 hours, or at least one week, or at least 10 days, or at least two weeks. As such, the addition of the viscosity buffer provides the mineral slurry with an enhanced resistance to sedimentation upon standing (i.e., without agitation) for a period longer than would be the case without the addition of the viscosity buffer, e.g., a period of at least one week, or at least 10 days, or at least two weeks. In certain embodiments, sedimentation (also known as settling) is determined in accordance with ASTM D869-85 (2011).

Additionally or alternatively, "stable" means that the mineral slurry including viscosity buffer has a reduced or no tendency to syneresis (i.e., the expulsion of liquid from the slurry forming a supernatant) over an extended period of time without agitation.

Analogous to the function of a pH buffer, a "viscosity buffer" is a component, or mixture of components, which serves to reduce or ameliorate the tendency of a mineral slurry comprising inorganic particulate material, such as hydrophobic minerals, to increase in viscosity and/or to sediment and/or to exhibit syneresis over an expanded period of time upon standing (that is, without agitation during the extended period). In other words, the viscosity buffer is used to reduce or prevent changes in the viscosity, sedimentation or syneresis properties of a mineral slurry comprising inorganic particulate material, for example, hydrophobic mineral, particularly at high mineral loading, e.g., a mineral loading of greater than 50% by weight based on the total weight of the slurry. Being able to control such properties is advantageous, particularly in applications such as coatings and paints, where the coating or paint may stand for long periods of time (e.g., on the shelf) before use by an end user. In certain embodiments, the extended period of time comprises storage at room temperature conditions.

"Without agitation" means that the mineral slurry is not subjected to any stirring, mixing or other form of agitation throughout the extended period, other than to test the Brookfield viscosity of the mineral slurry at intermittent periods of time during the extend period of time.

To assess the magnitude of the reduced tendency of the mineral slurry including viscosity buffer to viscosity increase, sedimentation and/or syneresis, the mineral slurry including viscosity buffer may be compared, in a controlled manner, to a comparable mineral slurry absent the viscosity buffer.

Inorganic Particulate Material

In certain embodiments, the inorganic particulate material is one or more of talc, bentonite, alumina, limestone, bauxite, gypsum, magnesium carbonate, calcium carbonate, perlite, dolomite, diatomite, mica, wollastonite and vermiculite.

In certain embodiments, the inorganic particulate material is a hydrophobic mineral, such as talc, for example, natural talc of synthetic talc (also known as talcose). In certain embodiments, the talc is chloritic talc. In certain embodiments, the hydrophobic mineral, for example, talc, has a particle size distribution.

In certain embodiments, the inorganic particulate material is rendered hydrophobic by treatment with a suitably hydrophobic treatment agent, for example, a hydrophobic surface treatment or coating agent. For example, in certain embodiments, the inorganic particulate material is a hydrophobic kaolin. In other embodiments, the inorganic particulate material is other than kaolin. In certain embodiments, the inorganic particulate material is a naturally hydrophobic mineral, for example, a hydrophobic mineral such as talc.

The inorganic particulate materials, for example, minerals, in the slurry are present in particulate form. Unless otherwise stated, particle size properties referred to herein for the particulate kminerals are as measured in a well known manner by sedimentation of the particulate material in a fully dispersed condition in an aqueous medium using a Sedigraph 5100 machine as supplied by Micromeritics Instruments Corporation, Norcross, Ga., USA (www.micromeritic.com), referred to herein as a "Micromeritics Sedigraph 5100 unit", and based on application of Stokes' Law. Such a machine provides measurements and a plot of the cumulative percentage by weight of particles having a size, referred to in the art as the 'equivalent spherical diameter' (e.s.d), less than given e.s.d values. The mean particle size $d_{50}$ is the value determined in this way of the particle e.s.d at which there are 50% by weight of the particles which have an equivalent spherical diameter less than that $d_{50}$ value. The $d_{90}$ value is the value at which 95% by weight of the particles have an esd less than that $d_{90}$ value. Particle size properties may be determined in accordance with ISO 13317-3, or any method equivalent thereto.

In certain embodiments, the inorganic particulate material, for example, hydrophobic mineral, for example, talc, has a $d_{50}$ of from about 0.1 µm to about 15.0 µm, for example, from about 0.5 µm to about 12.0 µm, or from about 0.75 µm to about 12.0 µm, and optionally a $d_{90}$ of from about 2.0 µm to about 30.0 µm.

In certain embodiments, the inorganic particulate material, for example, hydrophobic mineral, for example, talc, has a $d_{50}$ of from about 5.0 µm to about 15.0 µm, for example, from about 7.5 µm to about 12.5 µm, or from about 8.0 µm to 12.0 µm, or from about 8.0 µm to about 11.0 µm, or from about 8.5 µm to about 10.5 µm, or from about 9.0 µm to about 10.0 µm. In such embodiments, the inorganic particulate material, for example, hydrophobic mineral, for example, talc, may have a $d_{90}$ of from about 20.0 µm to about 40.0 µm, for example, from about 20.0 µm to about 30.0 µm, or from about 22.0 µm to about 28.0 µm. The inorganic particulate material described in this paragraph is sometimes referred to hereinafter as 'hydrophobic mineral (1)' or 'talc (1)'.

In certain embodiments, the inorganic particulate material, for example, hydrophobic mineral, for example, talc, has a $d_{50}$ of from about 0.1 µm to about 2.0 µm, for example, from about 0.25 µm to about 1.75 µm, or from about 0.5 µm to 1.5 µm, or from about 0.75 µm to about 1.25 µm, or from about 1.0 µm to about 1.2 µm. In such embodiments the inorganic particulate material, for example, hydrophobic mineral, for example, talc, may have a $d_{90}$ of from about 2.0 µm to about 4.0 µm, for example, from about 2.0 µm to about 3.0 µm, or from about 2.2 µm to about 2.8 µm. The inorganic particulate material described in this paragraph is sometimes referred to hereinafter as 'hydrophobic mineral (2)' or 'talc (2)'.

In certain embodiments, the inorganic particulate material, for example, mineral, for example, talc has a bimodal particle size distribution. For example, in certain embodiments, the hydrophobic mineral is a mixture of hydrophobic mineral (1) [e.g., talc (1)] and hydrophobic mineral (2) [e.g., talc (2)], e.g., a mixture of a talc having $d_{50}$ of from about 5.0 µm to about 15.0 µm and a talc having a $d_{50}$ of from about 0.1 µm to about 2.0 µm. The weight ratio of hydrophobic mineral (1) [e.g., talc (1)] to hydrophobic mineral (2) [e.g., talc (2)] may vary from about 10:1 to about 1:10, for example, from about 8:1 to about 1:8, or from about 6:1 to about 1:6, or from about 5:1 to about 1:5, or from about 4:1 to about 1:4, or from about 3:1 to about 1:3, or from about 2:1 to about 1:2, or about 1:1.

In certain embodiments, the inorganic particulate material, for example, mineral, for example, talc, has specific surface area (BET) of from about 1.0 m²/g to about 30.0 m²/g. As used herein, "specific surface area (BET)" means the area of the surface of the particles of the talc particulate with respect to unit mass, determined according to the BET method by the quantity of nitrogen adsorbed on the surface of said particles so to as to form a monomolecular layer completely covering said surface (measurement according to the BET method, AFNOR standard X11-621 and 622 or ISO 9277). In certain embodiments, specific surface is determined in accordance with ISO 9277, or any method equivalent thereto.

In certain embodiments, the inorganic particulate material, for example, mineral, for example, talc, e.g., talc (1), has a specific surface area (BET) of from about 0.5 m²/g to about 10 m²/g, for example, from about 1.0 m²/g to about 5.0 m²/g, or from about 1.5 m²/g to about 4.0 m²/g, or from about 2.0 m²/g to about 3.5 m²/g.

In certain embodiments, the inorganic particulate material, for example, mineral, for example, talc, e.g., talc (2), has a specific surface area (BET) of from about 10 m²/g to about 30 m²/g, for example, from about 15 m²/g to about 25 m²/g, or from about 17.5 m²/g to about 22.5 m²/g.

Viscosity Buffer

In certain embodiments, the viscosity buffer is or comprises an inorganic particulate material, for example, a hydrophilic mineral. In such embodiments, the hydrophilic mineral may be a hydrous kandite clay such as kaolin, halloysite or ball clay, an anhydrous (calcined) kandite clay such as metakaolin or fully calcined kaolin. In certain embodiments, the hydrophilic mineral is kaolin. In certain embodiments, viscosity buffer is or comprises bentonite, alumina, limestone, bauxite, gypsum, magnesium carbonate, calcium carbonate, perlite, dolomite, diatomite, mica, wollastonite or vermiculite. In certain embodiments, the viscosity buffer comprises a mixture of two or more of the aforementioned materials, for example, a mixture of kaolin and one or more of the aforementioned materials. The inorganic particulate material, for example, hydrophilic mineral, used as viscosity buffer is distinct from other inorganic particulate materials, e.g., hydrophobic minerals, comprised within the mineral slurry.

In certain embodiments, the inorganic particulate material used as viscosity buffer, for example, a hydrophilic mineral, for example, kaolin, has a $d_{50}$ of from about 0.1 μm to about 5.0 μm, for example, from about 0.2 μm to about 2.5 μm, or from about 0.4 μm to about 2.0 μm, or from about 0.5 μm to about 1.5 μm, or from about 0.5 μm to about 1.25 μm, or from about 0.5 μm to about 1.0 μm. In such embodiments, the hydrophobic mineral may have a $d_{90}$ of from about 2.0 μm to about 8.0 μm, for example, from about 2.0 μm to about 6.0 μm, or from about 3.0 μm to about 5.0 μm. The inorganic particulate material used as viscosity buffer and described in this paragraph is sometimes referred to hereinafter as 'hydrophilic mineral (1)' or 'kaolin (1)'.

In certain embodiments, the inorganic particulate material used as viscosity buffer, for example, a hydrophilic mineral, for example, kaolin, e.g., kaolin (1), has a specific surface area (BET) of from about 8 $m^2/g$ to about 25 $m^2/g$, for example, from about 10 $m^2/g$ to about 18 $m^2/g$, or from about 12 $m^2/g$ to about 16 $m^2/g$.

In certain embodiments, the inorganic particulate material used as viscosity buffer is a naturally hydrophobic material that has been rendered hydrophilic by treatment with a suitably hydrophilic treatment agent, for example, a hydrophilic surface treatment or coating agent.

In certain embodiment, the viscosity buffer is or comprises a non-mineral, non-polyacrylate material. In certain embodiments, the non-mineral, non-polyacrylate material is an organic material comprising ester and/or ether functional groups. In certain embodiments, the organic material comprising ester and/or ether functional groups is a polymeric material. Suitable non-mineral, non-polyacrylate materials include: a polyalkylene oxide adduct of the formula R—X, wherein R is the radical of a monoalcohol of 8 to 22 carbon atoms, of a monocarboxylic add of 8 to 22 carbon atoms or of their oxalkylation products with from 1 to 20 moles of an epoxide of 2 to 3 carbon atoms (e.g., ethylene oxide or propylene oxide) and X is the radical of a copolymer of an epoxide of 2 or 3 carbon atoms and tetrahydrofuran, with the proviso that the total amount of epoxide and tetrahydrofuran units in R—X is from 60 to 95 percent by weight and that the molar ratio of epoxide units to tetrahydrofuran units is from 1:0.5 to 1:3; water-soluble condensed phosphates; polyphosphates; polysulfonates; water-soluble salts of polysilicic acids; sodium maleate; citric acid; sodium; citrate, sodium silicate; EDTA; DTPA; and combinations thereof.

In certain embodiments, the viscosity buffer is or comprises a polyalkylene oxide adduct of the formula R—X, as described above. In certain embodiments, R is an oleic acid radical and the starting materials oleic acid, ethylene oxide and tetrahydrofuran are incorporated into the end product R—X in the weight ratio of 1:(1.5 to 2.5):(1.5 to 3). In certain embodiments, R is the polyethylene oxide adduct of oleic acid. In certain embodiments, R is the polyethylene oxide adduct of oleic add hydroxyethyl ester. In certain embodiments, R is the polyethylene oxide adduct of an oxoalcohol of 9 to 11 carbon atoms. In certain embodiments, R is the polyethylene oxide adduct of stearyl alcohol. In certain embodiments, the total amount of epoxide and tetrahydrofuran units in R—X is from 70 to 90 percent by weight. In certain embodiments, there are from 5 to 20 moles of epoxide and from 5 to 15 moles of tetrahydrofuran per mole of the alcohol or carboxylic acid. In certain embodiments the epoxide is ethylene oxide. In certain embodiments the epoxide is propylene oxide. In certain embodiments, the epoxide is a mixture of ethylene oxide and propylene oxide. In certain embodiments, the polyalkylene oxide adduct of the formula R—X is an oleo alkylenoxide block copolymer.

In certain embodiments, the viscosity buffer is a mixture of the inorganic particulate materials(s) described herein, for example, hydrophilic mineral and the non-polyacrylate polymeric material, for example, a mixture of kaolin, e.g., kaolin (1) and the polyalkylene oxide adduct of the formula R—X, as described above. In such embodiments, the viscosity buffer may be incorporated in the mineral slurry such that the mineral slurry comprises up to about 5.0% by weight of the polyalkylene oxide adduct of the formula R—X, and up to about 15.0% by weight of the hydrophilic material, based on the total weight of the mineral slurry. For example, in such embodiments, the mineral slurry may comprise up to about 2.0% by weight of the polyalkylene oxide adduct of the formula R—X, and up to about 10.0% by weight of the hydrophilic material, or may comprise up to about 2.0% by weight of the polyalkylene oxide adduct of the formula R—X, and up to about 15.0% by weight of the hydrophilic material, or may comprise up to about 1.5% by weight of the polyalkylene oxide adduct of the formula R—X, and up to about 12.0% by weight of the hydrophilic material, or may comprise up to about 1.0% by weight of the polyalkylene oxide adduct of the formula R—X, and up to about 8.0% by weight of the hydrophilic material, or may comprise up to about 1.0% by weight of the polyalkylene oxide adduct of the formula R—X, and up to about 6.0% by weight of the hydrophilic material, or may comprise up to about 0.75% by weight of the polyalkylene oxide adduct of the formula R—X, and up to about 12.0% by weight of the hydrophilic material, or may comprise up to about 0.5% by weight of the polyalkylene oxide adduct of the formula R—X, and up to about 10.0% by weight of the hydrophilic material, or may comprise up to about 0.5% by weight of the polyalkylene oxide adduct of the formula R—X, and up to about 8.0% by weight of the hydrophilic material, or may comprise up to about 0.5% by weight of the polyalkylene oxide adduct of the formula R—X, and up to about 6.0% by weight of the hydrophilic material.

Polyacrylate Dispersant

The mineral slurry may further comprise a polyacrylate dispersant. Surprisingly, however, it is found that the use of a polyacrylate dispersant alone, i.e., without the viscosity buffer, is not sufficient to produce a stable mineral slurry. This is surprising because, contrary to conventional wisdom, simply increasing the amount of such a dispersant in the mineral slurry does not produce a stable mineral slurry. In certain embodiments, the polyacrylate dispersant is a alkali metal or alkali earth metal salt of an acrylic polymer, for example, sodium polyacrylate. If present, the polyacrylate dispersant will be present in an amount of no more than about 2.0% by weight, based on the total weight of the mineral slurry, for example, no more than about 1.0% by weight, or no more than about 0.75% by weight, or no more than about 0.5% by weight, or no more than about 0.25% by weight. In certain embodiments, the polyacrylate dispersant is present in an amount of from about 0.1% to about 0.75% by weight of the mineral slurry, for example, from about 0.1% to about 0.5% by weight of the mineral slurry, or from about 0.1% to about 0.5% by weight of the mineral slurry, or from about 0.2 to about 0.4% by weight of the mineral slurry.

Mineral Slurry Composition

In certain embodiments, the mineral slurry has a total mineral solids content of at least about 50% by weight, based on the total weight of the mineral slurry. In certain embodiments, the mineral slurry has a total mineral solids content of at least about 55% by weight, or at least about 57.5% by weight, or at least about 60% by weight, or at least about 62.5% by weight, or at least about 65% by weight. In certain embodiments, the mineral slurry has a total mineral solids content of no more than about 80% by weight, based on the total weight of the mineral slurry. In certain embodiments, the mineral slurry has a total mineral solids content of from about 50% to about 80% by weight, for example, from about 50% to about 70% by weight, or from about 50% to about 65% by weight, or from about 55% to about 65% by weight, or from about 60% to about 65% by weight, based on the total weight of the mineral slurry.

In certain embodiments, the mineral slurry comprises at least about 40% by weight of hydrophobic mineral, based on the total weight of the mineral slurry, for example, at least about 45% by weight, or at least about 50% by weight, or at least about 55% by weight, or at least about 57.5% by weight, or at least about 60% by weight, or at least about 62.5% by weight, or at least about 65% by weight of hydrophobic mineral.

In certain embodiments, the mineral slurry comprises no more than about 20% by weight of viscosity buffer, based on the total weight of the mineral slurry, for example, no more than about 15% by weight of viscosity buffer, or no more than about 12.5% of viscosity buffer, or no more than 10% by weight of viscosity buffer, or more than about 7.5% by weight of viscosity buffer, or no more than about 5.0% by weight of viscosity buffer, or no more than about 2.5% by weight of viscosity buffer. In certain embodiments, the mineral slurry comprises at least about 0.25% by weight of viscosity buffer, for example, at least about 0.5% by weight of viscosity buffer, or at least about 0.75% by weight of viscosity buffer, or at least about 1.0% by weight of viscosity buffer. In certain embodiments, the mineral slurry comprises from about 1.0% to about 15% by weight of the viscosity buffer. As noted above, in such embodiments, the viscosity buffer may comprises a mixture of hydrophilic mineral and non-mineral, non-polyacrylate material, as described above, for example, a mixture of kaolin (1) and the polyalkylene oxide adduct of the formula R—X, as described above, for example, an oleo alkylenoxide block copolymer.

As discussed herein, incorporation of the viscosity buffer improves the long term stability of the mineral slurry. Thus, in certain embodiments, the mineral slurry is stable for at least one week without agitation, and/or (ii) the Brookfield viscosity (100 rpm @ 1 minute) of the mineral slurry does not increase by more than 200% following one week without agitation, and/or (iii) the mineral slurry has a Brookfield viscosity (100 rpm @ 1 minute) of no more than 1600 cP following one week without agitation.

In certain embodiments, the mineral slurry is stable for at least 10 days without agitation, or stable for at least two weeks without agitation.

In certain embodiments, the Brookfield viscosity (100 rpm @ 1 minute) of the mineral slurry, as determined in accordance with ASTM D2196, does not increase by more than about 200% following one week without agitation, for example, does not increase by more than about 150% following one week without agitation, or does not increase by more than about 100% following one week without agitation, or does not increase by more than about 75% following one week without agitation, or does not increase by more than about 50% following one week without agitation, or does not increase by more than about 40% following one week without agitation, or does not increase by more than about 35% following one week without agitation, or does not increase by more than about 30% following one week without agitation, or does not increase by more than about 25% following one week without agitation, or does not increase by more than about 20% following one week without agitation, or does not increase by more than about 15% following one week without agitation, or does not increase by more than about 10% following one week without agitation. The magnitude of any increase in Brookfield viscosity is determined by comparing the Brookfield viscosity following preparation of the mineral slurry (i.e., T=0) and the Brookfield viscosity of the mineral slurry following the expiration of a one week period without agitation.

In certain embodiments, the Brookfield viscosity (100 rpm @ 1 minute) of the mineral slurry, as determined in accordance with ASTM D2196, does not increase by more than about 200% following two weeks without agitation, for example, does not increase by more than about 150% following two weeks without agitation, or does not increase by more than about 100% following two weeks without agitation, or does not increase by more than about 75% following two weeks without agitation, or does not increase by more than about 50% following two weeks without agitation, or does not increase by more than about 40% following two weeks without agitation, or does not increase by more than about 35% following two weeks without agitation, or does not increase by more than about 30% following two weeks without agitation or does not increase by more than about 25% following two weeks without agitation, or does not increase by more than about 20% following two weeks without agitation, or does not increase by more than about 15% following two weeks without agitation, or does not increase by more than about 10% following two weeks without agitation. The magnitude of any increase in Brookfield viscosity is determined by comparing the Brookfield viscosity following preparation of the mineral slurry (i.e., T=0) and the Brookfield viscosity following the expiration of a two week period without agitation.

In certain embodiments, the mineral slurry has a Brookfield viscosity (100 rpm @ 1 minute), as determined in accordance with ASTM D2196, of no more than about 1600 centipoise (cP) following one week without agitation, for example, a Brookfield viscosity of no more than about 1400 cP following one week without agitation, or a Brookfield viscosity of no more than about 1200 cP following one week without agitation, or a Brookfield viscosity of no more than about 1000 cP following one week without agitation, or a Brookfield viscosity of no more than about 900 cP following one week without agitation, or a Brookfield viscosity of no more than about 850 cP following one week without agitation, or a Brookfield viscosity of no more than about 825 cP following one week without agitation, or a Brookfield viscosity of no more than about 800 cP following one week without agitation, or a Brookfield viscosity of no more than about 775 cP following one week without agitation, or a Brookfield viscosity of no more than about 755 cP following one week without agitation, or a Brookfield viscosity of no more than about 725 cP following one week without agitation, or a Brookfield viscosity of no more than about 700 cP following one week without agitation, or a Brookfield viscosity of no more than about 675 cP following one week without agitation, or a Brookfield viscosity of no more than about 650 cP following one week without agitation, or a Brookfield viscosity of no more than about 625 cP following one week without agitation, or a Brookfield viscosity of no more than about 600 cP following one week without agitation, or a Brookfield viscosity of no more than about 575 cP following one week without agitation, or a Brookfield viscosity of no more than about 550 cP following one week without agitation, or a Brookfield viscosity of no more than about 525 cP following one week without agitation, or a Brookfield viscosity of no more than about 500 cP following one week without agitation. In certain embodiments, the mineral slurry has a Brookfield viscosity of at least about 400 cP following one without agitation, for example, at least about 425 cP, or at least about 450 cP, or at least about 475 cP, or at least about 500 cP.

In terms of sedimentation, the mineral slurry may, in certain embodiments, be gel-free following one week without agitation, as determined in accordance with ASTM D2869-85 (2011). In certain embodiments, the mineral slurry is gel-free following two weeks without agitation.

In terms of syneresis, the mineral slurry may, in certain embodiments, exhibit no syneresis following one week without agitation. In certain embodiments, the mineral slurry exhibits no syneresis following two weeks without agitation.

The slurry comprises a liquid portion, for example, an aqueous medium, such as water. The liquid portion may constitute up to about 50% by weight of the mineral slurry, for example, from about 10 to about 40% by weight, or from about 20 to about 40% by weight, or from about 20 to about 35% by weight, or from about 25 to about 40% by weight, or from about 30 to about 40% by weight, or from about 25 to about 35% by weight of the mineral slurry, based on the total weight of the mineral slurry.

In certain embodiments, the mineral slurry has an alkaline pH, for example, a pH of from greater than 7 to about 13. In certain embodiments, the mineral slurry has a pH on no greater than 12.5, or no greater than 12, or no greater than 11.5, or no greater than 11, or no greater than 10.5, or no greater than 10.45. In certain embodiments, the pH is at least about 8, or at least about 9, or at least about 10.

The mineral slurry may further comprise components commonly found in coating and paint formulations. In certain embodiments, the mineral slurry comprises a pigment (i.e., a species other than the hydrophobic mineral). The pigment is that which provides the primary colouration of a paint, whether white or a colour shade. The term includes finely ground, natural or synthetic, inorganic or organic, insoluble dispersed particles which, when dispersed in a liquid vehicle, i.e., solvent, may provide, in addition to colour, many of the desired properties of paint, such as opacity, hardness, durability and corrosion resistance. Thus, by way of example, mineral slurry may comprise titanium dioxide. Other suitable pigments include, but are not limited to, titanium dioxide, carbon black, calcium sulphate, iron oxide, and the copper-complex phthalo blue. Other suitable pigments for providing colour will be readily apparent to persons skilled in the art. The mineral slurry may comprise at least east one further additive chosen from conventional additives, such as, for example, rheology modifier, thickener, defoamer or anti-foamer, biocide, pH adjustor (e.g., alkali or alkali earth metal hydroxide), binder, and antifreeze coalescent.

Suitable anti-foamers and defoamers include, for example, blends of surfactants, tributyl phosphate, fatty polyoxyethylene esters plus fatty alcohols, fatty acid soaps, silicone emulsions and other silicone containing compositions, waxes and inorganic particulates in mineral oil, blends of emulsified hydrocarbons and other compounds sold commercially to carry out this function.

Suitable biocides include, for example, oxidizing biocides such as chlorine gas, chlorine dioxide gas, sodium hypochlorite, sodium hypobromite, hydrogen, peroxide, peracetic oxide, ammonium bromide/sodium hypochlorite, or non-oxidising biocides such as GLUT (Glutaraldehyde, CAS No 90045-36-6), ISO (CIT/MIT) (Isothiazolinone, CAS No 55956-84-9 & 96118-96-6), ISO (BIT/MIT) (Isothiazolinone), ISO (BIT) (Isothiazolinone, CAS No 2634-33-5), DBNPA, BNPD (Bronopol), NaOPP, CARBAMATE, THIONE (Dazomet), EDDM—dimethanol (O-formal), HT—Triazine (N-formal), THPS—tetrakis (O-formal), TMAD—diurea (N-formal), metaborate, sodium dodecylbenene sulphonate, thiocyanate, organosulphur, sodium benzoate and other compounds sold commercially for this function.

Suitable rheology modifiers include cellulose-derived rheology modifiers, for example, microfibrillated cellulose, hydroxymethyl cellulose, hydroxyethyl cellulose, hydroxypropyl cellulose, hydroxypropylmethyl cellulose, carboxymethyl cellulose or a mixture thereof. Suitable non-cellulose-derived rheology modifiers include one or more of emulsion copolymers, dicyanamide, triols, polyoxyethylene ether, urea, sulphated castor oil, polyvinyl pyrrolidone, sodium alginate, xanthan gum, and sodium silicate.

The paint composition may further include dye. The distinction between powders which are pigments and those which are dyes is generally considered to be on the basis of solubility: pigments being insoluble and dispersed in the material, dyes being soluble or in solution when used.

Preparative Methods

The minerals in particulate form may be prepared using techniques well known to a person of skill in the art, for example, techniques selected from comminution (e.g., crushing, grinding, milling), classification (e.g., hydrodynamic selection, screening and/or sieving) and drying. The hydrophobic mineral in particulate form may obtained from a natural source by grinding. For example, natural talc particulate is typically obtained by crushing and then grinding a mineral source of talc, which may be which may be followed by a particle size classification step, in order to obtain a product having a desired particle size distribution. Clay particulates such as kaolin may be obtained in the same way. The minerals may be ground autogenously, i.e. by attrition between the particles of the mineral themselves, or, alternatively, in the presence of a particulate grinding medium comprising particles of a different material from the mineral particulate to be ground.

The mineral slurry, and coating compositions and paints comprising same, may be prepared by combining, e.g., mixing, and processing the components of the mineral slurry in appropriate amounts (depending on the desired composition) and under suitable conditions to obtain a stable mineral slurry. The various components may be processed by mixing or milling or in a high-speed dispersion tank in which the premixed components are subjected to high-speed agitation by a circular, toothed blade attached to a rotating shaft. In certain embodiments, the method is for making a mineral slurry which is stable for at least one week without agitation, the method comprising combining in a liquid the hydrophobic mineral with a stabilizing amount of the viscosity buffer.

Applications

As noted, owing to the advantageous stability properties of the mineral slurry, the mineral slurry may be used in or as a coating composition, such as a paint. The coating composition, for example, paint, may be applied to a substrate, e.g., an article of manufacture which are many and various, (e.g., a handy-craft item, a piece of furniture, a vehicle or sea-going vessel, piping, and the like) or a surface, e.g., the surface of a constructional element (e.g., interior/exterior walls, ceilings and floors of a dwelling place, outside fencing and trimming, and the like). Also provided is a canned paint comprising the paint according to certain embodiments. The term 'canned' is used herein to refer to any container suitable for paint, for example, a can, tub, bottle or pouch. The container may be formed from any material suitable for containing paint such as, for example, metal, plastic and glass.

The invention claimed is:

1. A method comprising combining, in suitable amounts, a inorganic particulate material, a viscosity buffer, and liquid to form a mineral slurry, wherein
the mineral slurry has a total solid minerals content of at least about 50% by weight, based on the total weight of the mineral slurry,
the mineral slurry comprises at least about 40% by weight of the inorganic particulate material, based on the total weight of the slurry,
the mineral slurry is stable for at least one week after formation without agitation;
the Brookfield viscosity (100 rpm @ 1 minute) of the mineral slurry does not increase by more than 200% following one week without agitation, and/or
the mineral slurry has a Brookfield viscosity (100 rpm @ 1 minute) of no more than 1600 cP following one week without agitation, and wherein the mineral slurry comprises:
  (A) talc (2);
  (B) a viscosity buffer comprising kaolin (1) and polyalkylene oxide adduct of the formula R—X; and
  (C) a polyacrylate dispersant,
wherein R is the radical of a monoalcohol of 8 to 22 carbon atoms, of a monocarboxylic acid of 8 to 22 carbon atoms or of their oxalkylation products with from 1 to 20 moles of an epoxide of 2 to 3 carbon atoms (e.g., ethylene oxide or propylene oxide) and X is the radical of a copal mer of an epoxide of 2 or 3 carbon atoms and tetrahydrofuran, and wherein the total amount of epoxide and tetrahydrofuran units in R—X is from 60 to 95 percent by weight and that the molar ratio of epoxide units to tetrahydrofuran units is from 1:0.5 to 1:3.

2. A method of making a mineral slurry which is stable for at least one week without agitation, the method comprising combining in a liquid an inorganic particulate material with a stabilizing amount of a viscosity buffer, wherein:
  (i) the mineral slurry is stable for at least one week without agitation, and/or
  (ii) the Brookfield viscosity (100 rpm @ 1 minute) of the mineral slurry does not increase by more than 200% following one week without agitation, and/or
  (iii) the mineral slurry has a Brookfield viscosity (100 rpm @ 1 minute) of no more than 1600 cP following one week without agitation, and wherein the mineral slurry comprises:
    (A) talc (2);
    (B) a viscosity buffer comprising kaolin (1) and polyalkylene oxide adduct of the formula R—X; and
    (C) a polyacrylate dispersant,
  wherein R is the radical of a monoalcohol of 8 to 22 carbon atoms of a monocarboxylic acid of 8 to 22 carbon atoms or of their oxalkylation products with from 1 to 20 moles of an epoxide of 2 to 3 carbon atoms (e.g., ethylene oxide or propylene oxide) and X is the radical of a copolymer of an epoxide of 2 or 3 carbon atoms and tetrahydrofuran, and
  wherein the total amount of epoxide and tetrahydrofuran units in R—X is from 60 to 95 percent by weight and that the molar ratio of epoxide units to tetrahydrofuran units is from 1:8.5 to 1:3.

3. A mineral slurry comprising an inorganic particulate material and a viscosity buffer, wherein:
  (i) the mineral slurry is stable for at least one week without agitation, and/or
  (ii) the Brookfield viscosity (100 rpm @ 1 minute) of the mineral slurry does not increase by more than 200% following one week without agitation, and/or
  (iii) the mineral slurry has a Brookfield viscosity (100 rpm @ 1 minute) of no more than 1600 cP following one week without agitation, and wherein the mineral slurry comprises:
    (A) a mixture of talc (1) and talc (2);
    (B) a viscosity buffer comprising kaolin (1) and/or polyalkylene oxide adduct of the formula R—X; and
    (C) a polyacrylate dispersant,
  wherein R is the radical of a monoalcohol of 8 to 22 carbon atoms, of a monocarboxylic acid of 8 to 22 carbon atoms or of their oxalkylation products with from 1 to 20 moles of an epoxide of 2 to 3 carbon atoms (e.g., ethylene oxide or propylene oxide) and X is the radical of a copolymer of an epoxide of 2 or 3 carbon atoms and tetrahydrofuran, and
  wherein the total amount of epoxide and tetrahydrofuran units in R—X is from 60 to 95 percent by weight and that the molar ratio of epoxide units to tetrahydrofuran units is from 1:0.5 to 1:3.

4. A mineral slurry comprising an inorganic particulate material and a viscosity buffer, wherein:
  (i) the mineral slurry is stable for at least one week without agitation, and/or
  (ii) the Brookfield viscosity (100 rpm @ 1 minute) of the mineral slurry does not increase by more than 200% following one week without agitation, and/or
  (iii) the mineral slurry has a Brookfield viscosity (100 rpm @ 1 minute) of no more than 1600 cP following one week without agitation, and wherein the mineral slurry comprises:
    (A) talc (2);
    (B) a viscosity buffer comprising kaolin (1) and polyalkylene oxide adduct of the formula R—X; and
    (C) a polyacrylate dispersant,
  wherein R is the radical of a monoalcohol of 8 to 22 carbon atoms, of a monocarboxylic acid of 8 to 22 carbon atoms or of their oxalkylation products with from 1 to 20 moles of an epoxide of 2 to 3 carbon atoms (e.g., ethylene oxide or propylene oxide) and X is the radical of a copolymer of an epoxide of 2 or 3 carbon atoms and tetrahydrofuran, and
  wherein the total amount of epoxide and tetrahydrofuran units in R—X is from 60 to 95 percent by weight and that the molar ratio of epoxide units to tetrahydrofuran units is from 1:0.5 to 1:3.

5. A mineral slurry comprising an inorganic particulate material and a viscosity buffer, wherein:
- (i) the mineral slurry is stable for at least one week without agitation, and/or
- (ii) the Brookfield viscosity (100 rpm @ 1 minute) of the mineral slurry does not increase by more than 200% following one week without agitation, and/or
- (iii) the mineral slurry has a Brookfield viscosity (100 rpm @ 1 minute) of no more than 1600 cP following one week without agitation, and wherein the mineral slurry comprises:
  - (A) talc (1);
  - (B) a viscosity buffer comprising kaolin (1) and polyalkylene oxide adduct of the formula R—X; and
  - (C) a polyacrylate dispersant,
- wherein R is the radical of a monoalcohol of 8 to 22 carbon atoms, of a monocarboxylic acid of 8 to 22 carbon atoms or of their oxalkylation products with from 1 to 20 moles of an epoxide of 2 to 3 carbon atoms (e.g., ethylene oxide or propylene oxide) and X is the radical of a copolymer of an epoxide of 2 or 3 carbon atoms and tetrahydrofuran, and
- wherein the total amount of epoxide and tetrahydrofuran units in R—X is from 60 to 95 percent by weight and that the molar ratio of epoxide units to tetrahydrofuran units is from 1:0.5 to 1:3.

6. A mineral slurry comprising an inorganic particulate material and a viscosity buffer, wherein:
- (i) the mineral slurry is stable for at least one week without agitation, and/or
- (ii) the Brookfield viscosity (100 rpm @ 1 minute) of the mineral slurry does not increase by more than 200% following one week without agitation, and/or
- (iii) the mineral slurry has a Brookfield viscosity (100 rpm @ 1 minute) of no more than 1600 cP following one week without agitation, and
- wherein the mineral slurry comprises:
  - (A) talc (1) and talc (2);
  - (B) a viscosity buffer comprising an organic material comprising ester and/or ether functional groups, or another non-mineral, non-polyacrylate material;
  - and wherein the non-mineral, non-polyacrylate material comprises a polyalkylene oxide adduct of the formula R—X; and
  - (C) a polyacrylate dispersant,
- wherein R is the radical of a monoalcohol of 8 to 22 carbon atoms, of a monocarboxylic acid of 8 to 22 carbon atoms or of their oxalkylation products with from 1 to 20 moles of an epoxide of 2 to 3 carbon atoms (e.g., ethylene oxide or propylene oxide) and X is the radical of a copolymer of an epoxide of 2 or 3 carbon atoms and tetrahydrofuran, and
- wherein the total amount of epoxide and tetrahydrofuran units in R—X is from 60 to 95 percent by weight and that the molar ratio of epoxide units to tetrahydrofuran units is from 1:0.5 to 1:3.

7. A coating composition comprising the mineral slurry according to claim 3.

8. The coating composition according to claim 7, wherein the coating is a paint.

9. A mineral slurry according to claim 3, wherein the mineral slurry has a total solids mineral content of at least about 50% by weight, based on the total weight of the slurry.

10. A mineral slurry according to claim 3, wherein the mineral slurry comprises at about 40% by weight of the inorganic particulate material.

11. A mineral slurry according to claim 3, wherein the slurry has a pH of no greater than 12.

12. A mineral slurry according to claim 4, wherein the mineral slurry has a total solids mineral content of at least about 50% by weight, based on the total weight of the slurry.

13. A mineral slurry according to claim 4, wherein the mineral slurry comprises at about 40% by weight of the inorganic particulate material.

14. A mineral slurry according to claim 4, wherein the slurry has a pH of no greater than 12.

15. A mineral slurry according to claim 5, wherein the mineral slurry has a total solids mineral content of at least about 50% by weight, based on the total weight of the slurry.

16. A mineral slurry according to claim 5, wherein the mineral slurry comprises at about 40% by weight of the inorganic particulate material.

17. A mineral slurry according to claim 5, wherein the slurry has a pH of no greater than 12.

18. A mineral slurry according to claim 6, wherein the mineral slurry has a total solids mineral content of at least about 50% by weight, based on the total weight of the slurry.

19. A mineral slurry according to claim 6, wherein the mineral slurry comprises at about 40% by weight of the inorganic particulate material.

20. A mineral slurry according to claim 6, wherein the slurry has a pH of no greater than 12.

* * * * *

UNITED STATES PATENT AND TRADEMARK OFFICE
CERTIFICATE OF CORRECTION

PATENT NO. : 10,781,107 B2
APPLICATION NO. : 15/562366
DATED : September 22, 2020
INVENTOR(S) : Verstuyft et al.

Page 1 of 1

It is certified that error appears in the above-identified patent and that said Letters Patent is hereby corrected as shown below:

In the Claims

Claim 9, Column 14, Line 14, "solids mineral" should read as --solid mineral--.

Claim 12, Column 14, Line 23, "solids mineral" should read as --solid mineral--.

Claim 15, Column 14, Line 32, "solids mineral" should read as --solid mineral--.

Claim 18, Column 14, Line 40, "solids mineral" should read as --solid mineral--.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*